US008804491B2

(12) United States Patent
Huang et al.

(10) Patent No.: US 8,804,491 B2
(45) Date of Patent: Aug. 12, 2014

(54) RECOVERY METHOD FOR RING-BASED NETWORK

(75) Inventors: Nen-Fu Huang, Hsinchu (TW); Chih-Hao Chen, New Taipei (TW)

(73) Assignee: National Tsing Hua University, Hsinchu (TW)

( * ) Notice: Subject to any disclaimer, the term of this patent is extended or adjusted under 35 U.S.C. 154(b) by 175 days.

(21) Appl. No.: 13/287,703

(22) Filed: Nov. 2, 2011

(65) Prior Publication Data

US 2013/0064069 A1    Mar. 14, 2013

(30) Foreign Application Priority Data

Aug. 9, 2011    (TW) .............................. 100128442 A (51) Int. Cl.
  *H04L 12/26* (2006.01)
  *H04L 12/437* (2006.01)
  *G06F 15/177* (2006.01)
  *G06F 11/00* (2006.01)

(52) U.S. Cl.
  CPC .................................. *H04L 12/437* (2013.01)
  USPC ........... 370/218; 370/225; 370/258; 370/403; 370/222; 709/239; 709/240; 709/221; 709/251; 714/4.1

(58) Field of Classification Search
  CPC .................................................. H04L 12/437
  USPC ................. 370/222, 224, 225, 218, 258, 403; 709/239, 240, 221, 251; 714/4.1
  See application file for complete search history.

(56) References Cited

U.S. PATENT DOCUMENTS

| | | | |
|---|---|---|---|
| 2007/0253330 A1* | 11/2007 | Tochio et al. ................. | 370/222 |
| 2009/0296569 A1* | 12/2009 | Ramalho Ribeiro Dos Santos et al. .......... | 370/222 |
| 2010/0195508 A1* | 8/2010 | Ling et al. ..................... | 370/248 |
| 2011/0019689 A1* | 1/2011 | Diab et al. .................... | 370/462 |
| 2011/0026394 A1* | 2/2011 | Feng et al. .................... | 370/217 |
| 2011/0161695 A1* | 6/2011 | Okita et al. ................... | 713/310 |
| 2012/0135781 A1* | 5/2012 | Lu et al. ........................ | 455/525 |
| 2012/0281710 A1* | 11/2012 | Holness et al. ............... | 370/406 |

* cited by examiner

*Primary Examiner* — Alpus H Hsu
*Assistant Examiner* — Walter Divito
(74) *Attorney, Agent, or Firm* — Wang Law Firm, Inc.; Li K. Wang; Stephen Hsu (57) ABSTRACT

A recovery method for ring-based network comprises following steps: when an error occurs at first node, second and third nodes adjacent to the first node transmit a link-down packet respectively; after the first node is repaired, the first, second and third nodes transmit a link-up packet respectively, and each link-up packet includes a priority value of the first, second or third node; the priority values of the first, second and third nodes are compared with each link-up packet to enter the ring port of the first node, the second node or the third node into a forward status or a blocked status; and a forward link or a blocked link is formed among the ring ports of the first, second and third nodes.

8 Claims, 6 Drawing Sheets

RECOVERY METHOD FOR RING-BASED NETWORK

CROSS-REFERENCE TO RELATED APPLICATION

This application claims the benefit of Taiwan Patent Application No. 100128442, filed on Aug. 9, 2011, in the Taiwan Intellectual Property Office, the disclosure of which is incorporated herein by reference.

BACKGROUND OF THE INVENTION

1. Field of the Invention

The present invention relates to a recovery method for a ring-based network, in particular to the recovery method for a ring-based network that uses a link as the connection base.

2. Description of the Related Art

The form of connecting networks includes Line, Ring, Bus, Star, Mesh or Tree topologies, wherein each node in a ring-based network is serially connected to form a closed ring structure. In local area network or industrial network applications, each node has a network switch, and each switch is connected to a communication device such as a computer, a server or a terminal for providing an information exchange function. In addition, the circuit of the ring-based network is a closed circular loop, so that when old information is looped and transmitted continuously and infinitely in the ring-based network, the bandwidth of the network will be occupied by old information, and new information cannot be transmitted. As a result, the network is paralyzed to form a broadcast storm. To solve this problem, the ring-based network generally adopts a ring port of a certain switch set at a blocked status, so that only specific control packets can be passed, and data packets are prohibited to avoid the problem of having information to be looped in ring-based network infinitely.

In addition, if any node or link in the network is abnormal, damaged, or interrupted, and the network cannot be used, the network will be paralyzed due to the information transmission characteristic of the ring-based network. To assure a smooth communication in the ring-based network, related solutions have been provided by network equipment suppliers and manufacturers, such as using an algorithm of the rapid spanning tree protocol (RSTP) to increase the recovery rate, but the reduced recovery time of the aforementioned solution still cannot meet the industrial requirements.

Among various solutions, the media redundancy protocol (MRP) set by the IEC 62439 standard of the International Electronics Commission (IEC) is the most eye-catching one. The MRP sets a ring portion of a master switch to a blocked status, and periodically sends out a detection signal to detect the working status of each switch or each link. If a certain switch or link in the loop is damaged, the ring port of the master switch will be switched from the blocked status to a forward status immediately to allow specific control packets and data packets to pass through simultaneously and start and conduct a spare link or network, so that the data packets can be transmitted through the spare link or network to prevent the termination of data transmissions or data loss caused by the interrupt of the network. After the damaged switch or link is repaired, the ring port at the forward status is switched back to the blocked status to enhance the stability of the ring-based network. However, the aforementioned method may cause misjudgment and failure when the network is overloaded or the range of the network topology is too large. Therefore, the IEC 62439 specification recommends that the ring-based network preferably uses less than 50 nodes, but such requirement cannot meet the actual requirement of the present industrial networks.

In conventional ring-based network recovery methods, a detection signal is sent out periodically and a timeout trigger mechanism is adopted for disconnection detections, but a misjudgment may occur easily under the aforementioned conditions. The recovery time of the ring-based network is set when the recovered control packet is informed, and the recovered control packet is looped around the whole ring-based network. After each node received the recovered control packet, each node will clear its own filtering database (FDB) to fit the ring topology after the link down occurs. However, the aforementioned method can recover the packets only after the last node has completed clearing its own filtering database, so that the recovery efficiency of the ring-based network is low.

In addition, if the ring-based network based on the master-slave switch architecture has a plurality of master switches, it is necessary to use a complicated and time-consuming priority setting procedure to determine using the switch of a second priority to form a master switch, when the master switch is damaged, so as to avoid a direct paralysis of the network. If the network has only one master switch, a serious single point failure problem exists.

SUMMARY OF THE INVENTION

In view of the aforementioned problems, it is a primary objective of the present invention to provide a distributed recovery method for a ring-based network to overcome the problems of the master priority competition and possible single point failure and reduce the recovery time significantly. In a link down condition, each node can complete removing the is filtering database and recover the original condition by half of the time for the link-down packet to loop a ring-based network. In a link up condition, the recovery can be completed within the time of creating the link up.

To achieve the aforementioned objective, the present invention provides a recovery method for a ring-based network. The ring-based network comprises a plurality of nodes, and each node has a priority value of each adjacent node, and the nodes include a first node, a second node and a third node. The recovery method comprises the steps of: transmitting a link-down packet from the second node and the third node adjacent to the first node separately if an error occurs at the first node, wherein each of the link-down packets has a priority value of the second node and the first node and a priority value of the third node and the first node; forming a forward link by a backup link of the ring-based network; transmitting a link-up packet from the first node, the second node and the third node separately after the first node is repaired, wherein and each of the link-up packets has a priority value of the first node, the second node and the third node; comparing the priority values of the first node, the second node and the third node with each of the link-up packet, such that a ring port of the first node, the second node or the third node enters into a forward status or a blocked status; and forming a blocked link or the forward link between the ring ports of the first node, the second node and the third node.

The recovery method for a ring-based network further comprises the step of detecting and obtaining a ring port link-down message by the second node and the third node, if an error occurs at the first node.

The recovery method for a ring-based network further comprises the step of comparing and analyzing the link-down packets by each node to obtain an error message when each node at both ends of the backup link receives the link-down packets separately; and analyzing the priority value of the first node by each of the nodes at both ends of the backup link to learn that the error message comes from the first node, when each link-down packet has the priority value of the first node at the same time. In the aforementioned method, each node can use the priority value in the link-down packet to determine the obtained error message relates to the same event in order to avoid repeated processing and shorten the recovery time.

The recovery method for a ring-based network further comprises the step of using the first node to load a priority value of the second node in the received link-up packet into a corresponding ring port of the second node and a priority value of the third node into a corresponding ring port of the third node after the first node is repaired, and using the second node to load a priority value of the first node in the received link-up packet into a corresponding ring port of the first node, and using the third node to load a priority value of the first node in the received link-up packet into a corresponding ring port of the first node.

Another objective of the present invention is to provide a recovery method for a ring-based network. The ring-based network comprises a plurality of nodes, and each node has priority values of adjacent nodes, and the nodes include a first node and a second node. The recovery method comprises the steps of: transmitting a link-down packet by the first node and the second node when an error occurs at the link between the first node and the adjacent second node, and each of the link-down packets having a priority value of the first node and the second node respectively; using a backup link of the ring-based network to form a forward link; transmitting a link-up packet by the first node and the second node after the link between the first node and the second node is repaired, and each of the link-up packets having priority values of the first node and the second node respectively; and entering adjacent ring ports between the first node and the second node into a blocked status to form a blocked link between the first node and the second node.

The recovery method for a ring-based network further comprises the step of: detecting and obtaining a ring port link-down message by the first node and the second node, when an error occurs at the link between the first node and the second node.

The recovery method for a ring-based network further comprises the steps of: comparing and analyzing the link-down packets to compute and obtain an error message by each of the nodes, when each of the nodes at both ends of the backup link receives the link-down packets, and analyzing the priority value of the first node and the priority value of the second node by each of the nodes at both ends of the backup link to learn that the error message comes with the link between the first node and the second node, when each of the link-down packets has the priority value of the first node and the priority value of the second node simultaneously. Therefore, each node can determine that the error message relates to the same even by the priority value of the link-down packet to avoid repeated processing and shorten the recovery time.

The recovery method for a ring-based network further comprises the step of using the first node to load a priority value of the second node in the received link-up packet into a corresponding ring port of the second node and using the second node to load a priority value of the first node in the received link-up packet into a corresponding ring port of the first node, after the link between the first node and the second node is repaired.

In summation, the recovery method for a ring-based network of the present invention has one or more of the following advantages:

(1) The recovery method has no limitation on the scale of implementation and can achieve a constant recovery time which is the time required for creating the link under the condition of a variable topology.

(2) The recovery method comes with an event trigger design for avoiding misjudgments caused by an overload of the network.

(3) By comparing and analyzing the priority value of the link-down packet, the node can locate the position of a damaged node or link in the ring-based network to filter the same abnormal event to shorten the recovery time.

(4) By the comparison of the priority value, each node determines the forward status or blocked status of the ring port of each node to recover the ring-based network automatically to achieve the effects of simplifying the priority setting procedure and reducing the time consumption.

DETAILED DESCRIPTION OF THE PREFERRED EMBODIMENTS

The technical characteristics and effects of the present invention will become apparent by the detailed description of preferred embodiments and related drawings as follows. For simplicity, same numerals are used to represent respective elements in the preferred embodiment and drawings.

Figure 1:
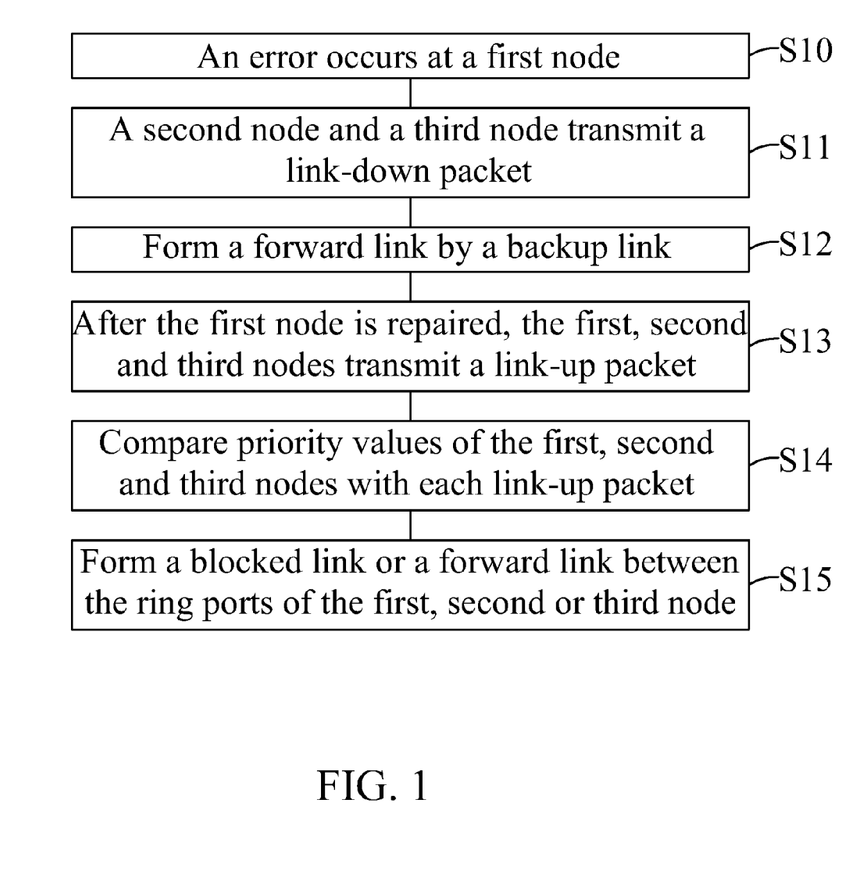
FIG. 1 is a flow chart of a recovery method for a ring-based network in accordance with a first preferred embodiment of the present invention.

With reference to FIG. 1 for a flow chart of a recovery method for a ring-based network in accordance with the first preferred embodiment of the present invention, the ring-based network comprises a plurality of nodes, and each node loads priority values of adjacent nodes, and the nodes including a first node, a second node and a third node with a priority value each. However, the present invention is not limited to such arrangement only. The recovery method comprises the following steps.

In Step S10, when an error occurs at the first node, adjacent second node and third node can detect and obtain a ring port link-down message.

In Step S11, the second node and third node adjacent to the first node includes a priority value of the first node, so that when the second node detects the ring port down-link, a link-down packet (down, 2, 1) including the priority values of the second node and the first node is sent to the ring-based network. Meanwhile, when the third node detects a ring port down-link, a link-down packet (down, 3, 1) including the priority values of the third node and the first node is sent to the ring-based network. The second node and the third node will clear the priority value of the first node.

In Step S12, when each node of at both ends of a backup link of the ring-based network receives the link-down packets, each node compares the link-down packets to compute and obtain an error message. If the link-down packets include a same priority value, it shows that an error occurs at the node represented by this priority value and notices the management staff about the location of the error of the node for repair. In the meantime, the nodes at both ends of the backup link will switch the ring port from the blocked status to the forward status, so that the backup link forms a forward link to permit specific control packets and data packets to pass through to avoid a communication interrupt of the network. In the meantime, the link-down packet is transmitted between the nodes of the ring-based network. When each node receives the link-down packets, the node will clear its filtering database and learn the new network topology again. Each node can determine whether or not the error message refer to the same link-down event according to the information in the link-down packet, so as to avoid handling the same event again and shorten the recovery time.

In Step S13, after the first node is repaired, the first node sends out a link-up packet (up, 1, 0) including a priority value to the adjacent second node and third node. The second node and the third node receive the link-up packet transmitted from the first node, and the priority value of the first node is loaded again, and the second node and the third node can send out link-up packets (up, 2, 0) and (up, 3, 0) including the priority value of the second node or the third node to the first node, so that the first node can load the priority value of the adjacent nodes.

In Step S14, the priority values of the first node, the second node and the third node are compared with each link-up packet, so that the ring ports of the first node, the second node and the third node are switched to a forward status or a blocked status. If the priority value of the first node is higher than the priority values of both second node and third node, then the ring ports of the second node and the third node adjacent to the first node will enter into the blocked status. The second node will sent out a link-up packet (up, 1, 2) having the priority values of the first node and the second node to the ring-based network. The third node will send out a link-up packet (up, 1, 3) having the priority values of the first node and the third node to the ring-based network.

In Step S15, when the second node or the third node receives a link-up packet (up, 1, 3) having the priority values of the first node and the third node, or a link-up packet (up, 1, 2) having the priority values of the first node and the third node, the priority values are compared with the link-up packet, so that a blocked link or a forward link is formed between the ring ports of the first node, the second node and the third node. If the priority value of the second node is higher than that of the third node, then the third node will switch the ring port of the adjacent first node to the forward status when the third node receives the link-up packet (up, 1, 2) having the priority values of the first node and the third node, the priority values are compared with the link-up packet, so that a forward link is formed between the third node and the first node. Since the priority value of the second node is higher than that of the third node, the second node will discard the link-up packet (up, 1, 3) when the second node receives the link-up packet (up, 1, 3) having the priority values of the first node and the third node, so that a blocked link is maintained between the second node and the first node to complete the recovery of the ring-based network, and the ring-based network has an updated backup link. When each node of the ring-based network receives the link-up packet, the new backup link is the original link-down link, so that it is not necessary to clear its own filtering database again.

Figure 2A:
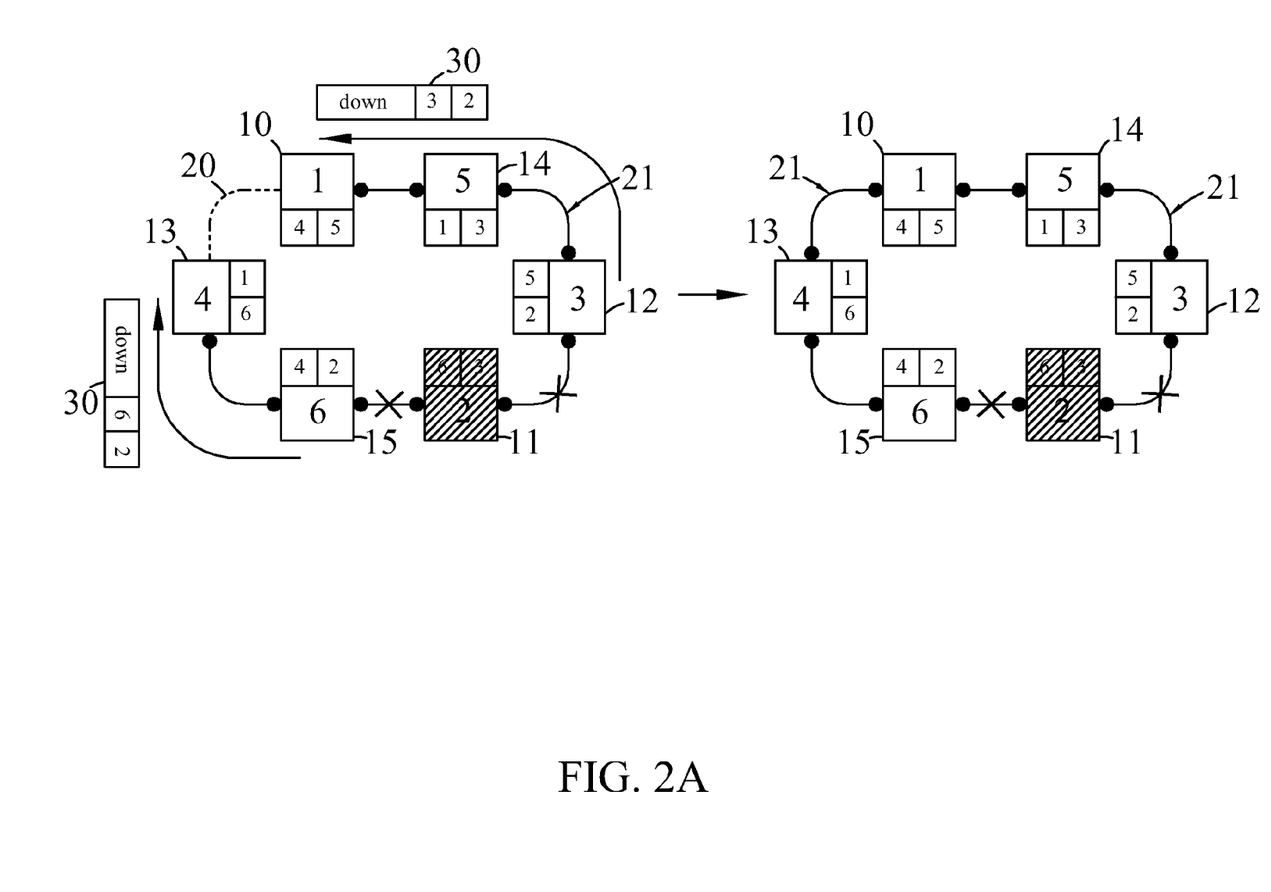
FIG. 2A is a schematic view of a first status of a recovery method for a ring-based network in accordance with the first preferred embodiment of the present invention.

With reference to FIG. 2A for a schematic view of a first status of a recovery method for a ring-based network in accordance with the first preferred embodiment of the present invention, the ring-based network comprises a plurality of nodes, and each node includes a switch for coupling a communication device such as a computer or a server. By linking the ring port of each node, the communication devices can exchange information through the ring-based network. In addition, a media access control address (MAC address) or an identity (ID) can be used for setting the priority value of each node, but the invention is not limited to such arrangement only. Each node can transmit a packet including a priority value to determine the priority of the packet transmitted from or received by each node. In the meantime, each node can load the priority value of the packet transmitted from each adjacent node into a corresponding ring port, and the priority value of each node is compared with the priority value of the received packet to determine the communication status between each node and its adjacent node. In addition, when an error occurs at a certain node of the ring-based network, each node can analyze the priority value of the packet to obtain the position of the node having the error. After the error is fixed, the link status between the repaired node and its adjacent node is redefined automatically, so that the ring-based network can be recovered automatically to be the ring-based network having a backup link.

For example, the ring-based network includes six switches which are No. 1 machine 10, No. 2 machine 11, No. 3 machine 12, No. 4 machine 13, No. 5 machine 14 and No. 6 machine 15 defined according to the priority value of each switch. The smaller the number, the higher is the priority. In other words, the No. 1 machine 10 has a priority value "1" higher than a priority value "2" of the No. 2 machine 11, and the priority value "2" of the No. 2 machine 11 is higher than a priority value "3" of the No. 3 machine 12, and the priority value "3" of the No. 3 machine 12 is higher than a priority value "4" of the No. 4 machine 13, and so forth.

In this preferred embodiment, a ring port of the No. 1 machine 10 is linked to a ring port of the No. 5 machine 14, and another ring port of the No. 1 machine 10 is linked to a ring port of the No. 4 machine 13. A ring port of the No. 3 machine 12 is linked to another ring port of the No. 5 machine 14, and another ring port of the No. 3 machine 12 is linked to a ring port of the No. 2 machine 11. A ring port of the No. 6 machine 15 is linked to another ring port of the No. 2 machine 11, and another ring port of the No. 6 machine 15 is linked to another ring port of the No. 4 machine 13. In the ring port of the No. 1 machine 10 corresponding to the No. 4 machine 13, a priority value "4" of the No. 4 machine 13 is loaded. In the ring port of the No. 5 machine 14, a priority value "5" of the No. 5 machine 14 is loaded. In a ring port of the No. 5 machine 14 corresponding to the No. 1 machine 10, a priority value "1" of the No. 1 machine 10 is loaded. In the ring port of the No. 3 machine 12, a priority value "3" of the No. 3 machine 12 is loaded, and so forth. In other words, each node is loaded with the priority value of the adjacent switch in the corresponding ring port.

If the link between the ring ports of the switches is a forward link 21, specific control packet and data packet are allowed to pass through. Only the link (link, 1, 4) between the ring ports of the No. 1 machine 10 and the No. 4 machine 13 is a backup link 20, which is the only normal blocked link in the network connection. In other words, only the control packet is allowed to pass through, and the data packet is prohibited. When an error occurs in a network connection, the backup link can be switched to a forward link immediately to allow all packets to pass through to avoid data loss caused by the termination of data transmission and the interrupt of the network.

It is noteworthy to point out that when the adjacent ring ports of two switches are in a forward status, the link between their ring ports is a forward link. For the example as shown in the figure, the ring port of the No. 3 machine 12 adjacent to No. 5 machine 14 indicated by a black dot represents a forward status, and the ring port of the No. 5 machine 14 adjacent to the No. 3 machine 12 also indicated by the black dot represents a forward status, so that the link between the No. 3 machine 12 and the No. 5 machine 14 is a forward link 21. If the adjacent ring ports of two switches are at a blocked status, the link between their ring ports is a blocked link, which can be used as a backup link 20 of the ring-based network. For example, the ring port (not marked by the black dot) of the No. 1 machine 10 adjacent to No. 4 machine 13, and the ring port (also not marked by the black dot) of the No. 4 machine 13 adjacent to the No. 1 machine 10 show that the adjacent ring ports of both No. 1 machine 10 and No. 4 machine 13 are at a blocked status, so that the link between the No. 1 machine 10 and the No. 4 machine 13 is a blocked link which serves as a backup link 20 of the ring-based network in this preferred embodiment.

In this preferred embodiment, if the No. 2 machine 11 is abnormal such that an error occurs in the network connection, then the No. 3 machine 12 and the No. 6 machine 15 detect a ring port down-link message to output the link-down packets 30 of (down, 3, 2) and (down, 6, 2) to the ring-based network to clear the priority value "2" loaded in the corresponding ring port of the No. 2 machine 11. After the No. 1 machine 10 and No. 4 machine 13 receive the link-down packets 30 of (down, 3, 2) or (down, 6, 2) respectively, the adjacent ring ports between the No. 1 machine 10 and the No. 4 machine 13 can be switched from the blocked status to the forward status, so that the backup link 20 is switched to the forward link 21 to avoid an interrupt of a network communication. Assumed that the No. 1 machine 10 receives the link-down packets 30 of (down, 3, 2) and (down, 6, 2), and both of these link-down packets 30 have a priority value "2", the No. 1 machine 10 can analyze to know that an error occurs at the No. 2 machine 11 represented by the priority value "2", and the two link-down packets 30 come from the same error event. Therefore, the No. 1 machine 10 will discard the latter received packet of (down, 6, 2) and will not transmit this packet. In the meantime, each node of the ring-based network can determine whether or not the link-down packets of (down, 3, 2) and (down, 6, 2) received by each node refer to the same event by the similar method as described above. In the same event, the filtering database is cleared once only, so as to avoid clearing the database repeatedly for the same event and save an unnecessary waste of the recovery time. It is noteworthy to point out that the link-down packet is transmitted from both ends of the ring-based network separately, so that the recovery time is simply half of the time for the link-down packet to loop a ring-based network, and each node has cleared its own filtering database already.

Figure 2B:
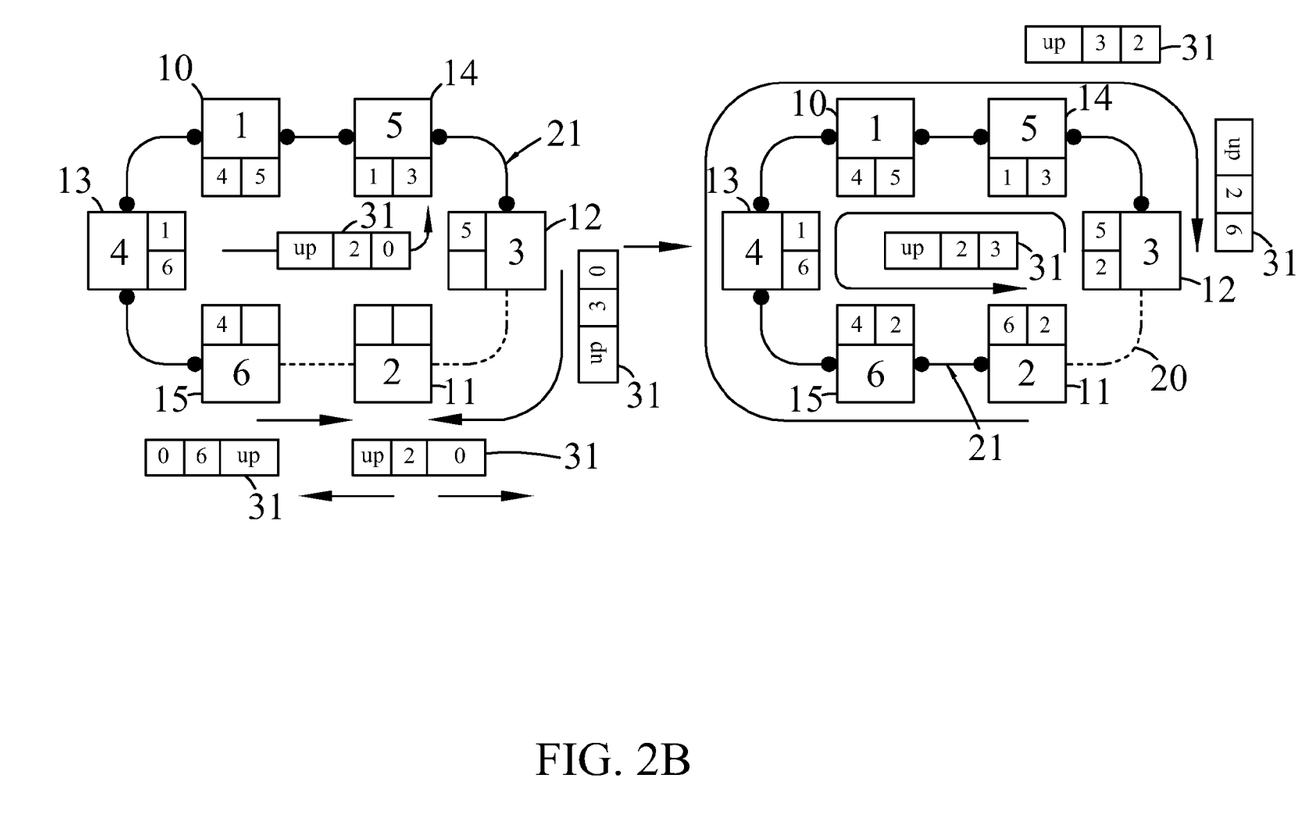
FIG. 2B is a schematic view of a second status of a recovery method for a ring-based network in accordance with the first preferred embodiment of the present invention.

With reference to FIG. 2B for a schematic view of a second status of a recovery method for a ring-based network in accordance with the first preferred embodiment of the present invention, after the No. 2 machine 11 is repaired, the No. 2 machine 11 will transmit a link-up packet 31 of (up, 2, 0) including a priority value "2" to the adjacent No. 3 machine 12 and No. 6 machine 15. The No. 3 machine 12 and the No. 6 machine 15 also transmit link-up packets 31 of (up, 3, 0) and (up, 6, 0) including priority values "3" and "6" to the No. 2 machine 11. The No. 2 machine 11, the No. 3 machine 12 and the No. 6 machine 15 will load the priority values of the adjacent servers into the corresponding ring ports. Now, the No. 2 machine 11 will receive (up, 3, 0) and (up, 6, 0) and compare with the priority value "2" again. Since the priority value "3" is higher than the priority value "6", therefore the No. 2 machine 11 will select the ring port adjacent to the No. 3 machine 12 to enter into a blocked status and discard the packet (up, 6, 0), and transmit the packet (up, 3, 2) to the No. 6 machine 15. Since the priority value "2" is higher than the priority value "3", therefore the No. 3 machine 12 will select the ring port adjacent to No. 2 machine 11 to enter into the blocked status, and transmit the link-up packet 31 of (up, 2, 3) to the No. 5 machine 14.

On the other hand, the priority value "2" is higher than the priority value "6", so that the No. 6 machine 15 will select the ring port adjacent to the No. 2 machine 11 to enter into the blocked status and transmit the packet (up, 2, 6) to the No. 4 machine 13. However, when the No. 6 machine 15 receives the packet (up, 3, 2), the priority value "3" is higher than the priority value "6", so that the ring port of the No. 6 machine 15 adjacent to No. 2 machine 11 is switched from the blocked status to the forward status to form a forward link 21 between the ring ports of the No. 6 machine 15 and the No. 2 machine 11. When the No. 3 machine 12 receives the packet (up, 2, 6), the priority value "6" is lower than the priority value "3", so that the ring port of the No. 3 machine 12 adjacent to No. 2 machine 11 is maintained at the blocked status to form a blocked link between ring ports of the No. 3 machine 12 and the No. 2 machine 11.

Finally, when the No. 2 machine 11 or the No. 3 machine 12 receives the packet (up, 2, 6), (up, 2, 3) or (up, 3, 2), the No. 2 machine 11 or No. 3 machine 12 will discard these packets and not transmit the packets to complete the recovery of the ring-based network, and the blocked link between the ring ports of the No. 3 machine 12 and the No. 2 machine 11 serves as an updated backup link 20 of the ring-based network.

Figure 3:
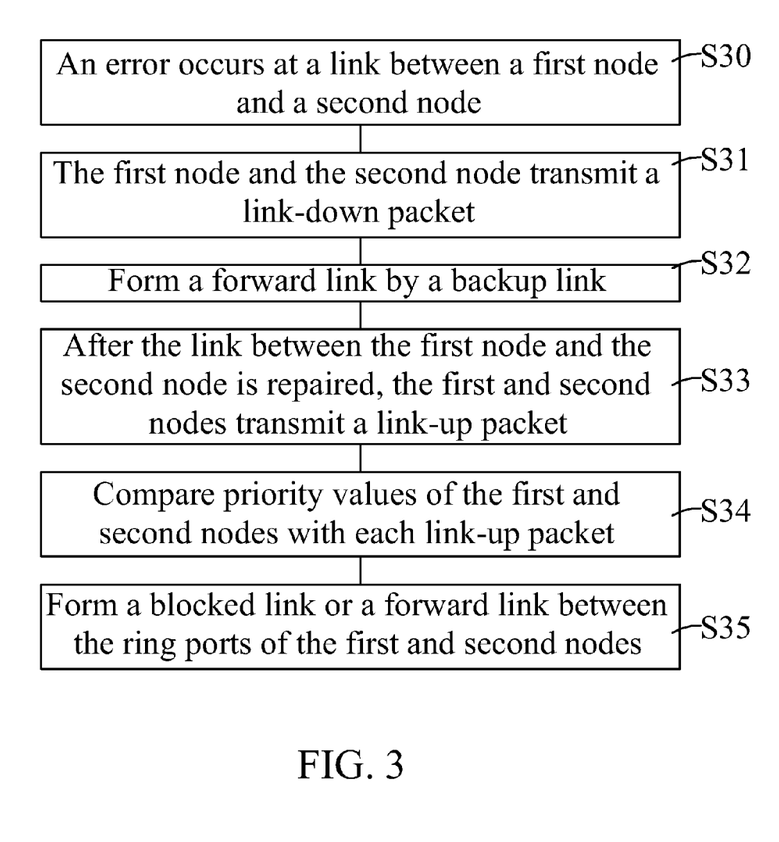
FIG. 3 is a flow chart of a recovery method for a ring-based network in accordance with a second preferred embodiment of the present invention.

With reference to FIG. 3 for a flow chart of a recovery method for a ring-based network in accordance with a second preferred embodiment of the present invention, the ring-based network comprises a plurality of nodes, and each node is loaded with a priority value of the adjacent node, and the nodes include a first node and a second node defined according to their priority values, but the invention is not limited to such arrangement only. The recovery method comprises the following steps.

In Step S30, when an error occurs at a link between the first node and its adjacent second node, the first node and the second node can detect and obtain a ring port link-down message.

In Step S31, when the first node detects a ring port down-link, a link-down packet (down, 1, 2) having priority values of the first node and the second node is transmitted to the ring-based network. In the meantime, if the second node detects a ring port down-link, a link-down packet (down, 2, 1) having priority values of the second node and the first node is transmitted to the ring-based network. The first node and the second node will clear the priority value loaded in the adjacent node.

In Step S32, when each node at both ends of a backup link of the ring-based network receive the link-down packets, each node will compare and analyze the link-down packets to compute and obtain an error message. If the link-down packets include the same priority value, we know that an error occurs at a link between the nodes represented by this priority value, and management staff can be noticed about the position of the link where the error occurs to facilitate a repair. In the meantime, each node at both ends of the backup link can switch the ring port from the blocked status to the forward status, so that the backup link forms a forward link to allow specific control packets and data packets to pass through and avoid the interrupt of a network communication.

In Step S33, after the link between the first node and the second node is repaired, the first node can transmit a link-up packet (up, 1, 0) including a priority value to the adjacent second node. The second node receives a link-up packet transmitted from the first node and loads the priority value of the first node again. The second node also transmits a link-up packet (up, 2, 0) including a priority value to the first node, such that the first node can load the priority value of the first node.

In Step S34, the priority values of the first node and the second node are compared with each link-up packet, so that the adjacent ring ports of the first node and the second node enter into a blocked status to form a blocked link. The first node will transmit a link-up packet (up, 1, 2) having priority values of the first node and the second node to the ring-based network. The second node will transmit a link-up packet (up, 2, 1) including priority values of the second node and the first node to the ring-based network.

In Step S35, when the first node or second node receives the link-up packet (up, 1, 2) including the priority values of the first node and the second node, or the link-up packet (up, 2, 1) including the priority value of the second node and the first node, these packets will be discarded and not transmitted anymore, so that the second node and the first node are maintained at a blocked link. The ring-based network is recovered to a network having a backup link.

Figure 4A:
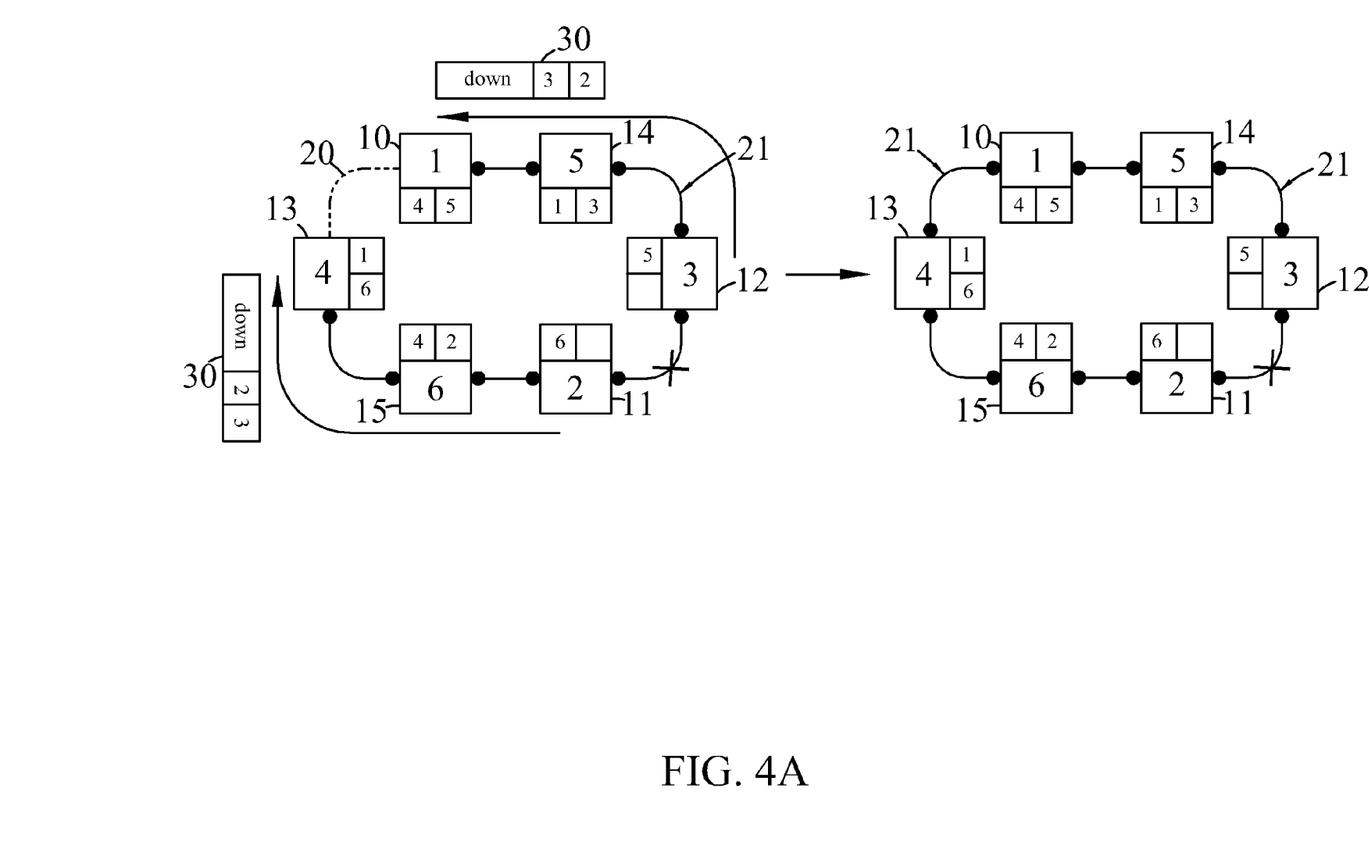
FIG. 4A is a schematic view of a first status of a recovery method for a ring-based network in accordance with the second preferred embodiment of the present invention.

With reference to FIG. 4A for a schematic view of a first status of a recovery method for a ring-based network in accordance with the second preferred embodiment of the present invention, the ring-based network comprises a plurality of nodes, and each node includes a switch for coupling a communication device such as a computer or a server. By linking the ring port of each node, the communication devices can exchange information through the ring-based network. In addition, a media access control address (MAC address) or an identity (ID) can be used for setting the priority value of each node, but the invention is not limited to such arrangement only. Each node can transmit a packet including a priority value to determine the priority of the packet transmitted from or received by each node. In the meantime, each node can load the priority value of the packet transmitted from each adjacent node into a corresponding ring port, and the priority value of each node is compared with the priority value of the received packet to determine the communication status between each node and its adjacent node. In addition, when an error occurs at a certain node of the ring-based network, each node can analyze the priority value of the packet to obtain the position of the node having the error. After the error is fixed, the link status between the repaired node and its adjacent node is redefined automatically, so that the ring-based network can be recovered automatically to be the ring-based network having a backup link.

For example, the ring-based network has six switches, which are No. 1 machine 10, No. 2 machine 11, No. 3 machine 12, No. 4 machine 13, No. 5 machine 14 and No. 6 machine 15 defined according to the priority value of each switch. The smaller the number, the higher is the priority. In other words, the No. 1 machine 10 has a priority value "1" higher than a priority value "2" of the No. 2 machine 11, and the priority value "2" of the No. 2 machine 11 is higher than a priority value "3" of the No. 3 machine 12, and the priority value "3" of the No. 3 machine 12 is higher than a priority value "4" of the No. 4 machine 13, and so forth.

In this preferred embodiment, a ring port of the No. 1 machine 10 is linked to a ring port of the No. 5 machine 14, and another ring port of the No. 1 machine 10 is linked to a ring port of the No. 4 machine 13. A ring port of the No. 3 machine 12 is linked to another ring port of the No. 5 machine 14, and another ring port of the No. 3 machine 12 is linked to a ring port of the No. 2 machine 11. A ring port of the No. 6 machine 15 is linked to another ring port of the No. 2 machine 11, and another ring port of the No. 6 machine 15 is linked to another ring port of the No. 4 machine 13. In the ring port of the No. 1 machine 10 corresponding to the No. 4 machine 13, a priority value "4" of the No. 4 machine 13 is loaded. In the ring port of the No. 5 machine 14, a priority value "5" of the No. 5 machine 14 is loaded. In a ring port of the No. 5 machine 14 corresponding to the No. 1 machine 10, a priority value "1" of the No. 1 machine 10 is loaded. In the ring port of the No. 3 machine 12, a priority value "3" of the No. 3 machine 12 is loaded, and so forth. In other words, each node is loaded with the priority value of the adjacent switch in the corresponding ring port.

If the link between the ring ports of the switches is a forward link 21, then specific control packet and data packet are allowed to pass through. Only the link (link, 1, 4) between the ring ports of the No. 1 machine 10 and the No. 4 machine 13 is a backup link 20, which is the only blocked link in the normal network connection. In other words, only the control packet is allowed to pass through, and the data packet is prohibited. When an error occurs in a network connection, the backup link can be switched to a forward link immediately to allow all packets to pass through to avoid data loss caused by the termination of data transmission and the interrupt of the network.

It is noteworthy to point out that when the adjacent ring ports of two switches are in a forward status, the link between their ring ports is a forward link. For the example as shown in the figure, the ring port of the No. 3 machine 12 adjacent to No. 5 machine 14 indicated by a black dot represents a forward status, and the ring port of the No. 5 machine 14 adjacent to the No. 3 machine 12 also indicated by the black dot represents a forward status, so that the link between the No. 3 machine 12 and the No. 5 machine 14 is a forward link 21. If the adjacent ring ports of two switches are at a blocked status, the link between their ring ports is a blocked link, which can be used as a backup link 20 of the ring-based network. For example, the ring port (not marked by the black dot) of the No. 1 machine 10 adjacent to No. 4 machine 13, and the ring port (also not marked by the black dot) of the No. 4 machine 13 adjacent to the No. 1 machine 10 show that the adjacent ring ports of both No. 1 machine 10 and No. 4 machine 13 are at a blocked status, so that the link between the No. 1 machine 10 and the No. 4 machine 13 is a blocked link which serves as a backup link 20 of the ring-based network in this preferred embodiment.

In this preferred embodiment, if an error occurs at a network connection due to an abnormal link between the No. 2 machine 11 and the No. 3 machine 12, then the No. 2 machine 11 and the No. 3 machine 12 will detect a ring port down-link message and output the link-down packets 30 of (down, 3, 2) and (down, 2, 3) to the ring-based network to clear the priority value "2" or "3" loaded in the ring port of the adjacent node. When the No. 1 machine 10 and the No. 4 machine 13 receive the link-down packets 30 of (down, 3, 2) and (down, 2, 3), the ring ports between the No. 1 machine 10 and the No. 4 machine 13 are switched from the blocked status to the forward status, so that the backup link 20 can be switched to a forward link 21 to avoid an interrupt of the network communication. Assumed that the No. 1 machine 10 receives the link-down packets 30 of (down, 3, 2) and (down, 2.3), and both of these link-down packets 30 have the priority values "2" and "3", the No. 1 machine 10 can analyze to know that an error occurs at the link between the No. 2 machine 11 and the No. 3 machine 12, and the two link-down packets 30 come from the same error event. Therefore, the No. 1 machine 10 will discard the latter received packet of (down, 2, 3) will not transmit this packet anymore. It is known that the link between the No. 2 machine 11 and the No. 3 machine 12 is abnormal. In the meantime, all nodes of the ring-based network can determine whether or not the two link-down packets refer to the same link-down event. In this preferred embodiment, when each node has the same link-down event, each node just clear its own filtering database once to avoid clearing the database repeatedly for the same event and save an unnecessary waste of the recovery time.

The link-down packet is transmitted from both ends of the ring-based network separately, so that the recovery time is simply half of the time for the link-down packet to loop a ring-based network.

Figure 4B:
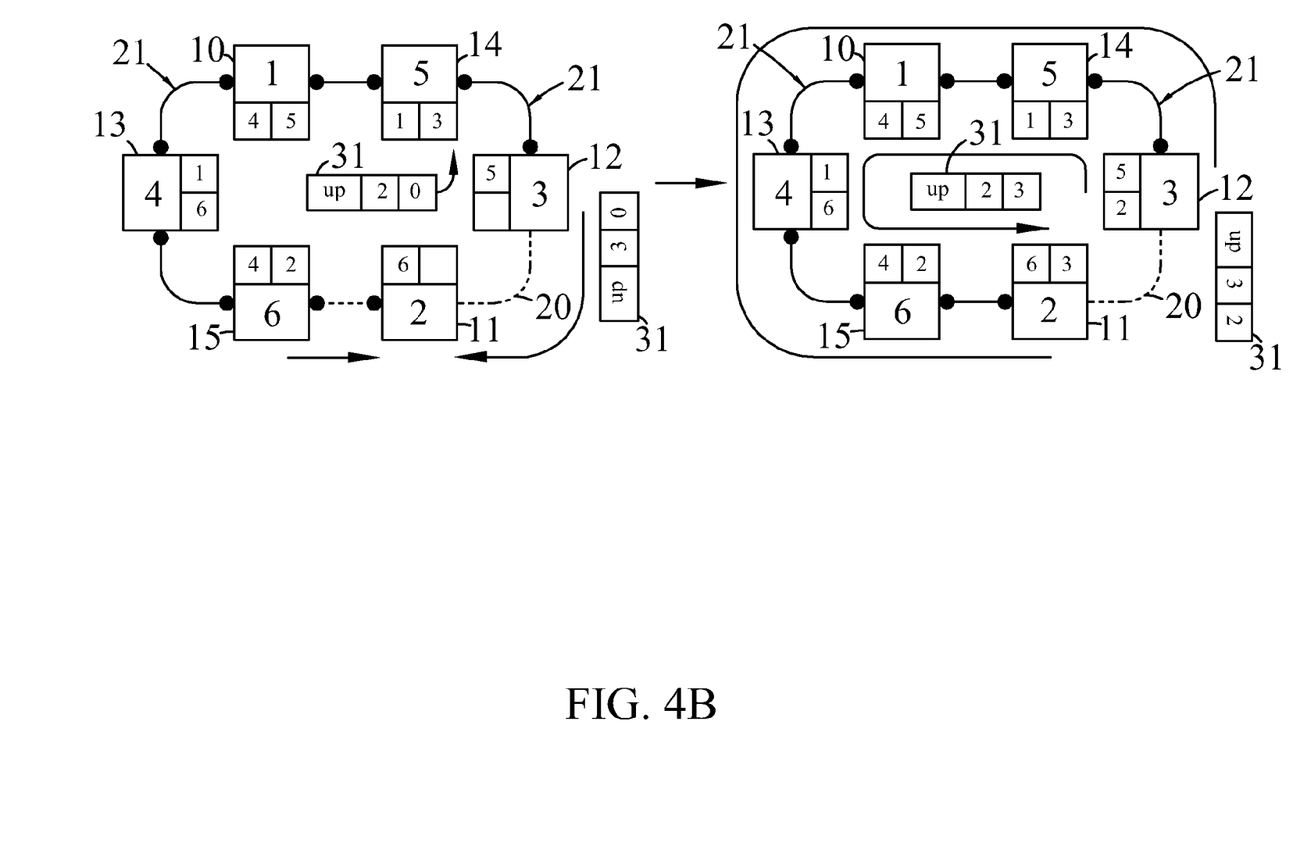
FIG. 4B is a schematic view of a second status of a recovery method for a ring-based network in accordance with the second preferred embodiment of the present invention.

With reference to FIG. 4B for a recovery method for a ring-based network in accordance with the second preferred embodiment of the present invention, after the link between the No. 2 machine 11 and the No. 3 machine 12 is repaired, the No. 2 machine 11 will send out a link-up packet 31 including the priority value "2" and (up, 2, 0) to the adjacent No. 3 machine 12 and No. 6 machine 15. The No. 3 machine 12 also sends out a link-up packet 31 including the priority value "3" and (up, 3, 0) to the No. 2 machine 11. The No. 2 machine 11 and No. 3 machine 12 record the priority values of the adjacent nodes into the corresponding ring ports. Now, the No. 2 machine 11 will select the ring port adjacent to No. 3 machine 12 to enter into the blocked status, and will revise the link-up packet 31 of (up, 3, 0) sent out from No. 3 machine to (up, 3, 2) and transfer it to the No. 6 machine 15.

In the meantime, the No. 3 machine 12 will select the ring port adjacent to No. 2 machine 11 to enter into the blocked status, and write the priority value of this machine into the link-up packet 31, so that the (up, 2, 0) sent out from the No. 2 machine is revised to (up, 2, 3) and then transmitted to the No. 5 machine 14 to update the blocked link of the ring ports between the No. 3 machine 12 and the No. 2 machine 11 as an updated backup link 20, so as to complete the recovery of the ring-based network.

In summation of the description above, when an error occurs during a link of the ring-based network, the backup link is switched to the forward link status to recover the link of the network connection. After the node or link with errors is repaired, the priority value of each node is compared with the priority value of each received packet to set a forward link or a blocked link in order to recover the ring-based network having a backup link.

What is claimed is:

1. A recovery method for a ring-based network, and the ring-based network comprising a plurality of nodes, and each of the nodes having a priority value of each of the adjacent nodes and their own priority value, and the nodes including a first node, a second node and a third node, and the first node being between the second node and the third node, and the recovery method comprising the steps of:

transmitting a link-down packet having a priority value of the second node and the first node from the second node to the ring-based network and transmitting a link-down packet having the priority value of the third node and the first node from the third node to the ring-based network;

forming a forward link by a backup link of the ring-based network;

examining the priority values of the link-down packets by each of the nodes at both ends of the backup link except downed node after receiving the link-down packets; and determining which one of the plurality of nodes is downed if each of the link-down packets has the priority value of the downed node simultaneously; wherein each of the nodes at both ends of the backup link discards a latter received link-down packet without transmitting to the rest of nodes;

transmitting a link-up packet from the first node, the second node and the third node separately after the first node is repaired, wherein each of the link-up packets has two priority values of nodes selected from the group consisting of the first node, the second node and the third node;

comparing the priority values of the first node, the second node and the third node with each of the link-up packet after the first node is repaired, such that a ring port of the first node, the second node or the third node enters into a forward status or a blocked status after the first node is repaired;

forming a blocked link or the forward link between two of the ring ports selected from the group consisting of the first node, the second node and the third node;

clearing the priority value of the first node by the second node after the second node transmits the link-down packet with the priority values of the second node and the first node; and clearing the priority value of the first node by the third node after the third node transmits the link-down packet with the priority values of the third node and the first node.

2. The recovery method for a ring-based network as recited in claim 1, further comprising the step of:

creating a ring port link-down message by the second node and the third node, if an error has occurred at the first node and detected by the second node and the third node.

3. The recovery method for a ring-based network as recited in claim 1, further comprising the steps of:

using the first node to load a priority value of the second node in the received link-up packet into a corresponding ring port of the second node and a priority value of the third node into a corresponding ring port of the third node after the first node is repaired, and using the second node to load a priority value of the first node in the received link-up packet into a corresponding ring port of the first node, and using the third node to load a priority value of the first node in the received link-up packet into a corresponding ring port of the first node.

4. The recovery method for a ring-based network as recited in claim 1, further comprising the steps of:

using the blocked link to form the backup link of the recovered ring-based network.

5. A recovery method for a ring-based network, and the ring-based network comprising a plurality of nodes, and each of the nodes having a priority value of each of the adjacent nodes and their own priority value, and the nodes including a first node and a second node, and the recovery method comprising the steps of:

transmitting a link-down packet by the first node and the adjacent second node when an error occurs at the link between the first node and the adjacent second node, and each of the link-down packets having a priority value of the first node and the second node;

using a backup link of the ring-based network to form a forward link;

examining the priority values of the link-down packets by each of the nodes at both ends of the backup link after receiving the link-down packets to determine which link between the two nodes of the plurality of nodes is downed if each of the link-down packets has the priority value of the two nodes simultaneously; wherein each of the nodes at both ends of the backup link discards a latter received link-down packet without transmitting to the rest of nodes;

transmitting a link-up packet by the first node and the second node after the link between the first node and the second node is repaired, and each of the link-up packets having priority values of the first node and the second node; and entering adjacent ring ports between the first node and the second node into a blocked status to form a blocked link between the first node and the second node after the link between the first node and the second node is repaired; and clearing the loaded priority value of the second node by the first node after the first node transmits the link-down packet having the priority values of the first node and the second node; and clearing the loaded priority value of the first node by the second node after the second node transmits the link-down packet having the priority values of the first node and the second node.

6. The recovery method for a ring-based network as recited in claim 5, further comprising the steps of:

creating a ring port link-down message by the first node and the second node, when an error has occurred at the link between the first node and the second node and detected by the first node and the second node and the third node.

7. The recovery method for a ring-based network as recited in claim 5, further comprising the steps of:

using the first node to load a priority value of the second node in the received link-up packet into a corresponding ring port of the second node and using the second node to load a priority value of the first node in the received link-up packet into a corresponding ring port of the first node, after the link between the first node and the second node is repaired.

8. The recovery method for a ring-based network as recited in claim 5, further comprising the steps of:

using the blocked link to form the backup link of the recovered ring-based network.

* * * * *